US006898471B1

(12) United States Patent
Sun et al.

(10) Patent No.: US 6,898,471 B1
(45) Date of Patent: May 24, 2005

(54) MULTIVARIATE RBR TOOL AGING ADJUSTER

(75) Inventors: Cheng-I Sun, Taipei (TW); Yu Pen Fun, Hsin-Chu (TW); Yi-Chuan Lo, Hsin-Chu (TW); Wei-Hsuang Huang, Hsin-Chu (TW); Hsiang-Ming Lin, Hsin-Chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 10/749,698

(22) Filed: Dec. 31, 2003

(51) Int. Cl.[7] ............................................. G06F 19/00
(52) U.S. Cl. ....................................................... 700/96
(58) Field of Search .......................... 700/90, 95–102, 700/117–121; 438/5, 14

(56) References Cited

U.S. PATENT DOCUMENTS

| | | | |
|---|---|---|---|
| 5,243,377 A | 9/1993 | Umatate et al. | 355/53 |
| 5,757,673 A | 5/1998 | Osheiski et al. | 364/552 |
| 5,862,054 A | 1/1999 | Li | 364/468.28 |
| 5,943,550 A * | 8/1999 | Fulford et al. | 438/14 |
| 5,963,902 A | 10/1999 | Wang | 704/243 |
| 6,148,239 A * | 11/2000 | Funk et al. | 700/1 |
| 6,238,936 B1 | 5/2001 | Yu | 438/7 |
| 6,245,581 B1 | 6/2001 | Bonser et al. | 438/8 |
| 6,248,602 B1 * | 6/2001 | Bode et al. | 438/14 |
| 6,263,255 B1 | 7/2001 | Tan et al. | 700/121 |
| 6,303,395 B1 * | 10/2001 | Nulman | 438/14 |
| 6,405,144 B1 * | 6/2002 | Toprac et al. | 702/84 |
| 6,701,206 B1 * | 3/2004 | Markle et al. | 700/121 |
| 6,735,493 B1 * | 5/2004 | Chou et al. | 700/121 |
| 6,738,682 B1 * | 5/2004 | Pasadyn | 700/100 |

OTHER PUBLICATIONS

U.S. Appl. No. 10/313,501, filed Dec. 6, 2002, TSMC–01–1509, assigned to the same assignees, "Multivariate RBR Tool Aging Detector".

* cited by examiner

*Primary Examiner*—Maria N. Von Buhr
(74) *Attorney, Agent, or Firm*—Thomas, Kayden, Horstemeyer & Risley

(57) ABSTRACT

A multiple run by run process is described. A plurality of tools and a plurality of products to be run on the tools are provided. A desired recipe is calculated for each product on each tool based on a previous recipe used for each product on each tool and deviation of a parameter from a target value. Thereafter, the plurality of products is run on the plurality of tools. The desired recipe is updated after each run of each tool.

15 Claims, 4 Drawing Sheets

MULTIVARIATE RBR TOOL AGING ADJUSTER

RELATED PATENT APPLICATION

U.S. patent application Ser. No. 10/313,501, to the same inventors, filed on Dec. 6, 2002.

BACKGROUND OF THE INVENTION (1) Field of the Invention

The present invention relates to the fabrication of integrated circuit devices, and more particularly, to a method of monitoring tool performance using a multivariate advanced process control system in the fabrication of integrated circuit devices.

(2) Description of the Prior Art

Run by Run (RBR) feedback control schemes have been used widely to control and monitor the semiconductor manufacturing processes. Statistical process control is combined with feedback control and uses data from past runs to adjust the recipe for the next run. This method offers the potential for reducing process variability caused by equipment aging, chemical depletion, or fluctuation in ambient conditions with a minimal cost. Most literature in the RBR control, however, is only applicable to the manufacturing process with a single product by a single tool. For a foundry industry, due to different customer requirements, one of the most popular production styles is multiple products by multiple tools. For example, if a process runs eight products by five tools, then there are forty combinations which will lead to a very complex situation using conventional RBR control schemes. If separate feedback schemes are set up for each combination, besides affecting the efficiency of the RBR control schemes, this method also ignores the useful information between the tools and products. For example, under a specific tool, an individual control scheme does feedback only on a specific product and it loses the opportunity to adjust for other products produced by the same tool. In addition, since customer orders may not be continuous and scheduled tool set-up may change from time to time, the feedback scheme for any production lot cannot be successfully applied to the next production lot. Therefore, it is desired to provide a multiple run by run control process.

A number of patents address process control issues. For example, U.S. Pat. No. 5,963,902 to Wang uses an expectation maximization (EM) model in a pattern recognition process. U.S. Pat. No. 6,238,936 to Yu teaches mapping critical dimension (CD) of predetermined features at various process stages. A user can look at the data to see if adjustments should be made to an etching process. U.S. Pat. No. 5,757,673 to Osheiski et al teaches automated analysis of data from self-tests of steppers uploaded as an ASCII file. U.S. Pat. No. 6,245,581 to Bonser et al teaches a method of measuring critical dimension, analyzing the measurement, and performing a secondary etch process based on the analysis. U.S. Pat. No. 5,862,054 to Li shows a process parameter monitoring system. Statistical Process Control (SPC) analysis is performed on data from each machine. Results are displayed in graphical form. U.S. Pat. No. 6,263,255 to Tan et al discloses a software framework for measurement, processing, and strategy control of a factory. U.S. Pat. No. 5,243,377 to Umatate et al shows a lithography control system.

SUMMARY OF THE INVENTION

Accordingly, it is a primary object of the invention to provide a multiple run by run process control method.

Another object of the invention is to provide a multiple run by run process control method that works across tools and products.

Yet another object is to provide a multiple run by run process to detect tool aging.

Yet another object is to provide a multiple run by run process to detect photolithography tool aging.

A further object is to provide a multiple run by run process to detect photolithography tool aging based on exposure dose.

A still further object is to provide a multiple run by run process to update a recipe based on past data.

Another object of the invention is to provide a multiple run by run process to update a recipe for a particular tool and product based on tool decay and variation shift of product.

In accordance with the objects of the invention, a multiple run by run process is achieved. A plurality of tools and a plurality of products to be run on the tools are provided. A desired recipe is calculated for each product on each tool based on a previous recipe used for each product on each tool and deviation of a parameter from a target value. Thereafter, the plurality of products is run on the plurality of tools. The desired recipe is updated after each run of each tool.

BRIEF DESCRIPTION OF THE DRAWINGS

In the accompanying drawings forming a material part of this description, there is shown.

DESCRIPTION OF THE PREFERRED EMBODIMENTS

The process of the present invention is a multiple run by run advanced process control system. This system is a model-based process control system which combines the advantages of statistical process control (SPC) with feed backward control to monitor processes and prescribe control action as needed. The APC system of the present invention uses statistical methodology to find the process optimization model and apply the process recipe to maintain the best process performance during a process shift or drift of controllable scope. The APC system diagnoses process variation and judges whether or not corrective action is to be taken. The process recipe is updated when necessary to meet the process target. Statistical methods are applied to calculate process variation to achieve a stable and accurate feedback algorithm. The process of the invention improves the process capability index by reducing the rework rate, increasing throughput, reducing consumption of materials (such as photoresist in a photolithography process), and decreasing engineer labor.

The multiple run by run (MRBR) APC method of the present invention can be used for any process in semiconductor manufacturing. The photolithography process will be used to demonstrate the MRBR scheme of the present invention. It will be understood by those skilled in the art that the MRBR scheme of the present invention can be used in any process in semiconductor manufacturing and that the invention should not be limited to the photolithography process and the energy parameter described as an example herein.

Figure 1:
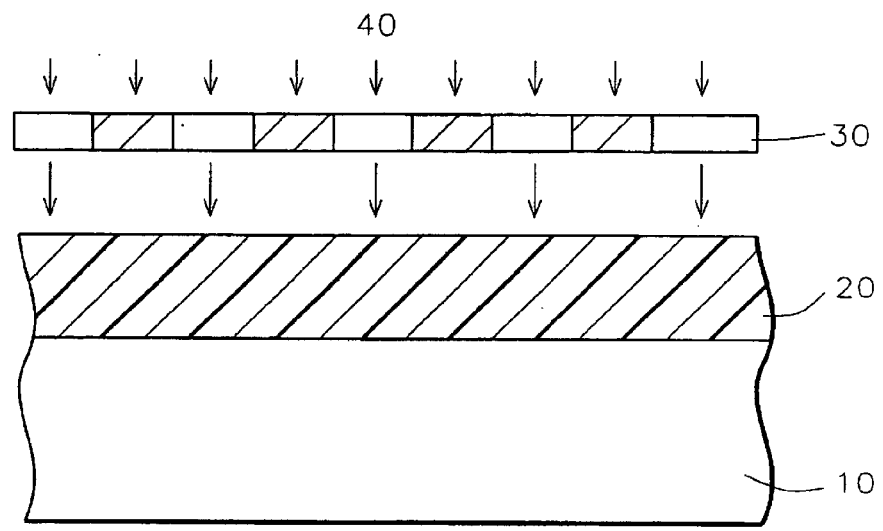
FIGS. 1 and 2 are cross-sectional representations of a photolithographic process.
Figure 2:
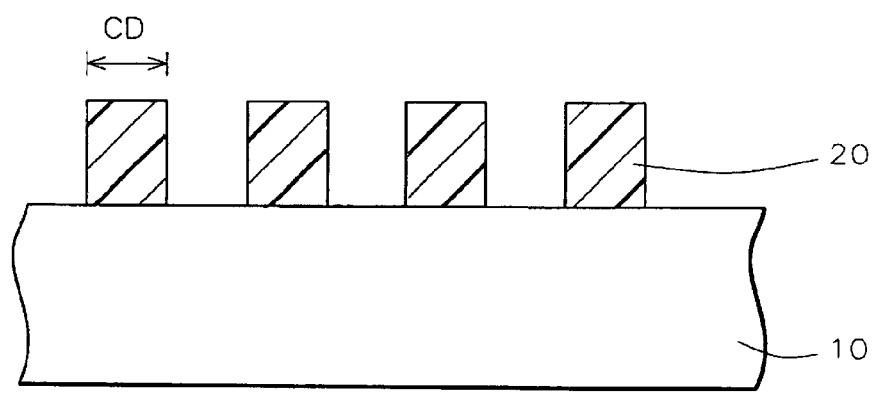

FIGS. 1 and 2 illustrate the photolithography process flow. FIG. 1 shows a wafer 10 covered by a photoresist layer 20. A mask 30 is placed over the wafer. The photoresist is exposed to light 40 through the mask. The photoresist is developed to leave the patterned photoresist layer shown in FIG. 2.

The quality characteristic of the photolithography process is critical dimension (CD), shown in FIG. 2. According to physical knowledge, CD is a function of the input recipe and the exposure dose or energy (E). The increment or decrement of the energy will lead to a proportional change in CD. Based on this relationship, the MRBR controller is to adjust the energy setting such that CD will meet a specific target.

Figure 3:
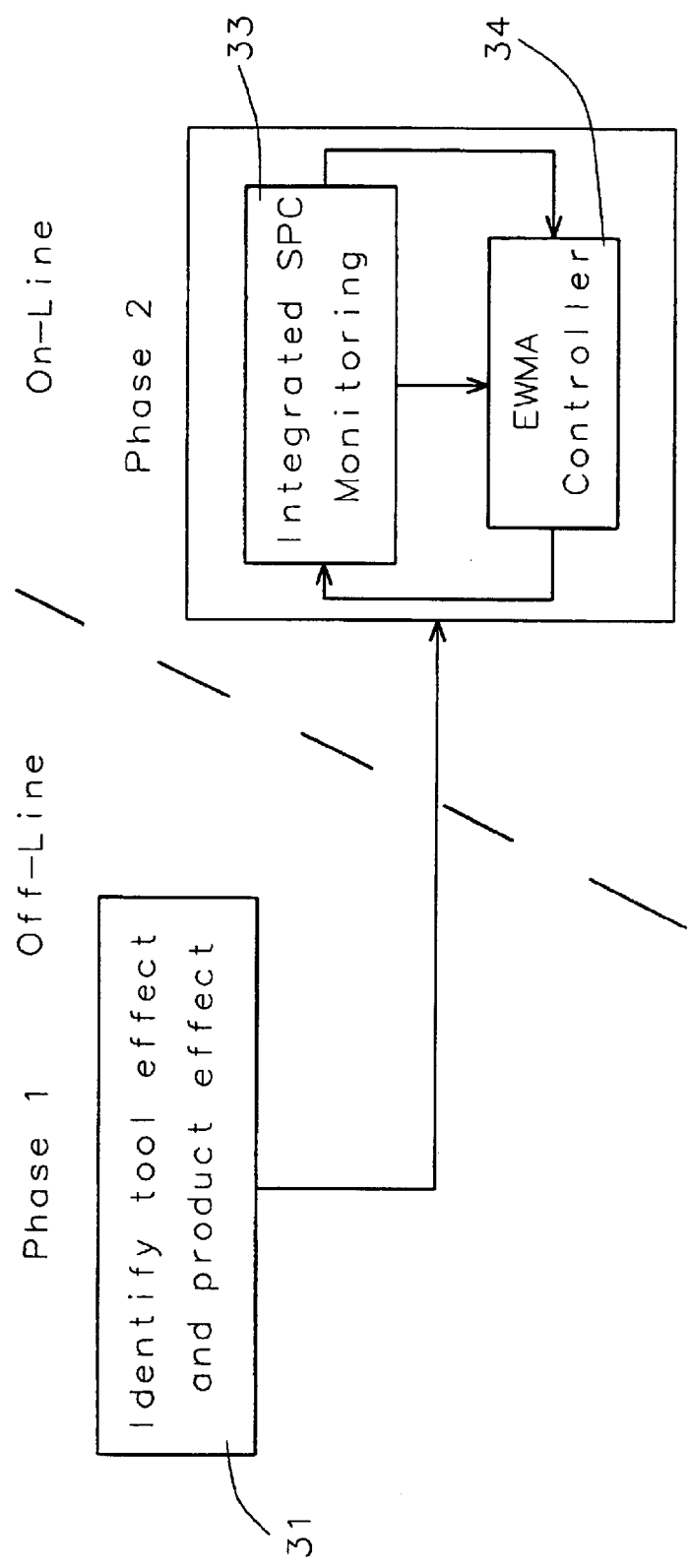
FIG. 3 is a diagram of the two phases of the advanced process control system of the present invention.

FIG. 3 is a diagram of the two phases of the MRBR system of the present invention. In a first phase 31, data is collected and entered into a database. This phase takes place off-line. First we build a prediction model for the photolithography process as follows:

$$E_{run} = (E_{B/R} + E_{Reticle}) \times \text{Tool}_{offset} + C_{correction} \quad (1)$$

where $E_{run}$=process energy $E_{B/R}$=basic record energy $E_{Reticle}$=mask error energy $\text{Tool}_{offset}$=tool energy ratio $C_{correction}$=k shift energy correction The parameters above are defined for each process, reticle, and tool. Other information to be collected includes CD target, process time, and so on. Now, two datasets are to be constructed: Desired Energy and Adjusted Energy. These datasets are two-dimensional arrays $D=[d_{ij}]$ and $A=[a_{ij}]$, respectively, where i=1, ..., n represents reticle ID and j=1, ..., m represents tool ID. The input data contain several variables including mask level, tool ID, product ID, reticle ID, target, CD output, and energy. The adjusted energy is to compensate for the bias between output CD and target CD. By linear approximation, the following formula can be used to obtain the adjusted energy of each production run:

$$\text{Adjusted Energy} = \text{slope} \times (CD - \text{Target}) \quad (2)$$

The constant slope is assigned by the user, depending upon mask level, the magnitude of the final energy, and so on. Hence, the desired energy of each production run is given by:

$$\text{Desired Energy} = \text{Final Energy} + \text{Adjusted Energy} \quad (3)$$

The value $d_{ij}$ is equal to the original final energy plus the adjusted energy; that is:

$$d_{ij} = e_{ij} + a_{ij}, \text{ for } i=1, \ldots, n; j=1, \ldots, m \quad (4)$$

Now the two tables are to be generated. For example, this procedure can be as follows:
1. Input the values of the slope.
2. Data sorting by tool ID, mask level, target, and reticle ID.
3. Use equations (1) and (2) to obtain the Adjusted Energy and Desired Energy of each production run.
4. Desired Energy Table:
    a. Average the Desired Energy in the same tool ID and reticle ID
    b. Decompose the average Desired Energy dataset by tool ID into several sub-datasets.
    c. Merge the decomposed sub-datasets by reticle ID and set the value of missing cells to zero.
5. Adjusted Energy Table:
    a. Average the Adjusted Energy in the same tool ID and reticle ID
    b. Decompose the average Adjusted Energy dataset by tool ID into several sub-datasets.
    c. Merge the decomposed sub-datasets by reticle ID and set the value of missing cells to zero.

Now, we need to compensate for missing data in the two tables. We can use an expectation maximization (EM) algorithm, a recursive algorithm used to forecast or estimate the Desired Energy of zero-containing cells in the dataset. We may use the following procedure, for example:
1. Create a dummy array $U=[u_{ij}]$ having the same size as the Desired Energy array. Let $u_{ij}=0$ if $d_{ij}$ is not missing (>0) and $u_{ij}=1$ if $d_{ij}$ is missing (=0).
2. Calculate the missing numbers in each row and each column:

$$u_{i.} = \sum_{j=1}^{m} u_{ij}, i = 1, 2, \ldots, n \quad (5)$$

$$u_{.j} = \sum_{i=1}^{n} u_{ij}, j = 1, 2, \ldots m \quad (6)$$

3. Calculate the row means of the array D:

$$\sum_{i=1}^{n} d_{ij} / (n - u_{.j})$$

4. Replace every missing cell of the array D by the corresponding row means.
5. Set the stop condition of the recursive algorithm; for example, Stop=105 and iteration=30.
6. If the stop condition is false, do:
    a. Calculate column means and row means:

$$d_{.j}[k] = \sum_{i=1}^{n} d_{ij}[k]/n, j = 1, \ldots, m$$

$$d_{i.}[k] = \sum_{j=1}^{m} d_{ij}[k]/m, i = 1, \ldots n$$

where k is the iteration number
    b. from i=1 to n
        from j=1 to m
            If $u_{ij}=1$, then
                $d_{ij}[k+1]=(m \times (n \times d_{.j}[k] - d_{ij}[k]) + n \times (m \times d_{i.}[k] - d_{ij}[k]) - (n \times m \times d_{..}[k] - d_{ij}[k]))/((n-1)(m-1))$
    c. Let $M=\Sigma(d_{ij}[k+1] - d_{ij}[k])2$, for all $u_{ij}=1$.
    d. If M>Stop or k<iteration, go to a.

For example, the desired energy table is given in Table 1A. Two cells are empty.

TABLE 1A

| Product | Tool 1 | Tool 2 | Tool 3 | Tool 4 |
|---------|--------|--------|--------|--------|
| 1 | 31.38 | 28.24 | 33.17 | 34.96 |
| 2 | 0 | 28.81 | 33.46 | 33.65 |
| 3 | 29.11 | 0 | 31.51 | 32.72 |

Step 3: Calculate row means:
(31.38+28.24+33.17+34.96)/4=31.94
(28.81+33.46+33.65)/3=31.97
(29.11+31.51+32.72)/3=31.11
Step 4: Replace missing cells with row means:

TABLE 1B

| Product | Tool 1 | Tool 2 | Tool 3 | Tool 4 |
|---------|--------|--------|--------|--------|
| 1 | 31.38 | 28.24 | 33.17 | 34.96 |
| 2 | 31.97 | 28.81 | 33.46 | 33.65 |
| 3 | 29.11 | 31.11 | 31.51 | 32.72 |

Step 6: Iterate.
k=1:
  Row means:
    (31.38+28.24+33.17+34.96)/4=31.94
    (31.97+28.81+33.46+33.65)/4=31.97
    (29.11+31.11+31.51+32.72)/4=31.11
  Column means:
    (31.38+31.97+29.11)/3=30.82
    (28.24+28.81+31.11)/3=29.39
    (33.17+33.46+31.51)/3=32.71
    (34.96+33.65+32.72)/3=33.78
d21[2]=(4×(3×30.82−31.97)+3×(4×31.97−31.97)−(12×31.67−31.97))/6=30.27
d32 [2]=(4×(3×29.39−31.11)+3×(4×31.11−31.11)−(12×31.67−31.11))/6=26.82

TABLE 1C

| Product | Tool 1 | Tool 2 | Tool 3 | Tool 4 |
|---------|--------|--------|--------|--------|
| 1 | 31.38 | 28.24 | 33.17 | 34.96 |
| 2 | 30.27 | 28.81 | 33.46 | 33.65 |
| 3 | 29.11 | 26.82 | 31.51 | 32.72 | k=2; Repeat

TABLE 1D

| Product | Tool 1 | Tool 2 | Tool 3 | Tool 4 |
|---------|--------|--------|--------|--------|
| 1 | 31.38 | 28.24 | 33.17 | 34.96 |
| 2 | 30.98 | 28.81 | 33.46 | 33.65 |
| 3 | 29.11 | 26.70 | 31.51 | 32.72 | k=3; Repeat

TABLE 1E

| Product | Tool 1 | Tool 2 | Tool 3 | Tool 4 |
|---------|--------|--------|--------|--------|
| 1 | 31.38 | 28.24 | 33.17 | 34.96 |
| 2 | 31.00 | 28.81 | 33.46 | 33.65 |
| 3 | 29.11 | 26.70 | 31.51 | 32.72 |

Now, we need to obtain the optimal setting for each tool ratio using the reticle energy and the correct energy table. The correct energy table is generated by finding the difference between the desired energy and the actual energy for each tool and product combination.

The ideal model for energy is $$E_{run}=(E_{B/R}+E_{Reticle})\times \text{Tool}_{offset} \quad (7)$$

This is equation (1) without the correction factor. The optimal energy setting could be modularized by tool ratio, base energy and reticle energy. In practice, there is a difference between the energy of the model and the optimal energy; this is the correction factor in equation (1). Ignoring the correction factor for now, we take the logarithm of both sides of equation (7) and get:

$$\log(E_{run})=\log(E_{B/R}+E_{Reticle})+\log(\text{Tool}_{offset}) \quad (8)$$

To estimate the tool ratios or offsets, the following procedure may be used:
1. Take the logarithm, $1d_{ij}=\log(d_{ij})$
2. Estimate the tool ratio:
   a. Suppose that the subscript index of the golden Tool ID is index j=j0. (The golden Tool is that tool which has the most stable quality in the process.)
   Let $\Gamma_{old}$ be the original tool ratio of the golden tool.

$$\text{temp-ratio} = \sum_{i=1}^{n}(1d_{i,j0}-1e_{i,j0})\times(1-u_{i,j0})/(n-u_{.j0})$$

Then, $\Gamma_{new}=\Gamma_{old}\times\exp(\text{temp-ratio})$
   b. Calculate tool ratios $\Gamma_j$, j=1, ..., m $$\text{Calculate the column means: } 1d_{.j}=\sum_{i=1}^{n}1d_{i,j}/n$$

Calculate tool ratios except j=j0:

$$\Gamma_j=\exp(1d_{.j}-1d_{.j0})\times\Gamma_{new}$$

3. Calculate reticle energy:
   a. Input base energy $E_{B/R}$.

$$\text{b. Calculate row means: } 1d_{i.}=\left(\sum_{j=1}^{m}1d_{ij}\right)/m, i=1,\ldots,n$$

$$\text{c. Let } \alpha_i = 1d_{i.} - \left(\sum_{j=1}^{m}1d_{.j}\right)/m + 1d_{.j0} - \log(\Gamma_{new}) - \log(E_{B/R})$$

Then, the Energy of the Reticle is
$E_t(\exp(\alpha_i)-1)\times E_{B/R}$, where $E_{B/R}$ is the corresponding Base Energy of the Reticle ID.
   d. Now, create an array for recording the correct energy table, using the correction factor.

$$C=[c_{ij}], i=1,\ldots,n; j=1,\ldots,m$$

$$c_{ij}=d_{ij}-(E_{B/R}+E_{reticle})\times\text{Tool}_{offset}$$

This completes the first phase.

Figure 4:
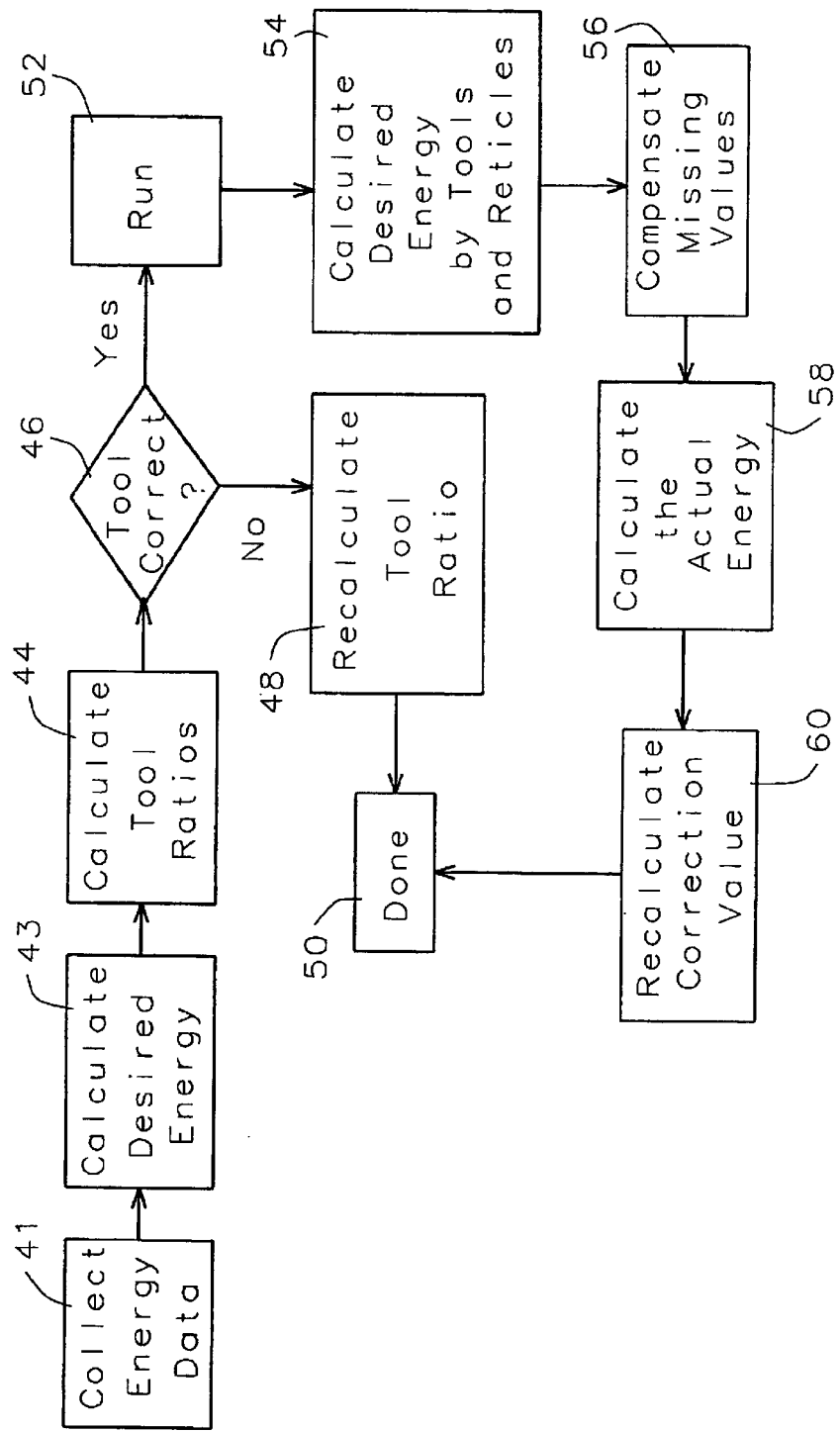
FIG. 4 illustrates a flow chart of the feedback control portion of the statistical process control portion of Phase 2 of the advanced process control system of the present invention.

The second phase of the APC system of the present invention is performed on-line. This phase includes adjusting the recipe by an Exponential Weighted Moving Average (EWMA) controller 34 and detecting the changes on tool effect and product effect using integrated statistical process control 33. The feed backward system of the present invention is shown in the flowchart of FIG. 4.

First as shown in step 41, energy data is collected. This is the actual exposure energy used in the process step. Now, in step 43, calculate the Desired Energy where Desired Energy(New Final Energy)=Final Energy+ w*slope*(Target−CD)

That is, $E_{ij}(t)=E_{ij}(t-1)+w \times slope \times (Target-CD)$

The final energy is equal to the desired energy in Phase I. The initial value was found in Phase I.

Now, in step 44, tool ratios are calculated. For each control ID, a tool aging ratio is calculated using the equation:

$Q_t(i)=Q_{t-1}(i)+\log(Desired\ Energy)-\log(Final\ Energy)$ where Q is the tool aging ratio and where $Q_0(i)=0$.

In step 46, the tool ratio is checked against user-defined aging criteria. If the tool ratio does not meet the criteria, the tool ratio is re-calculated in step 48. If tool aging is detected, the tool ratio or tool offset is recalculated.

In step 52, if no tool aging is detected, the tool ratio is not recalculated. Processing continues as normal.

Now, in step 54, calculate Desired Energy by tools and reticles. Then, in step 56, fill in the missing values. This step is similar to the calculation of the tables in Phase I. However, Phase II is dynamic. New tools and new products will be released to production; thus, missing cells will be found and must be recalculated.

In step 58, the Actual Energy is calculated. The correction value is calculated in step 60.

Figure 5:
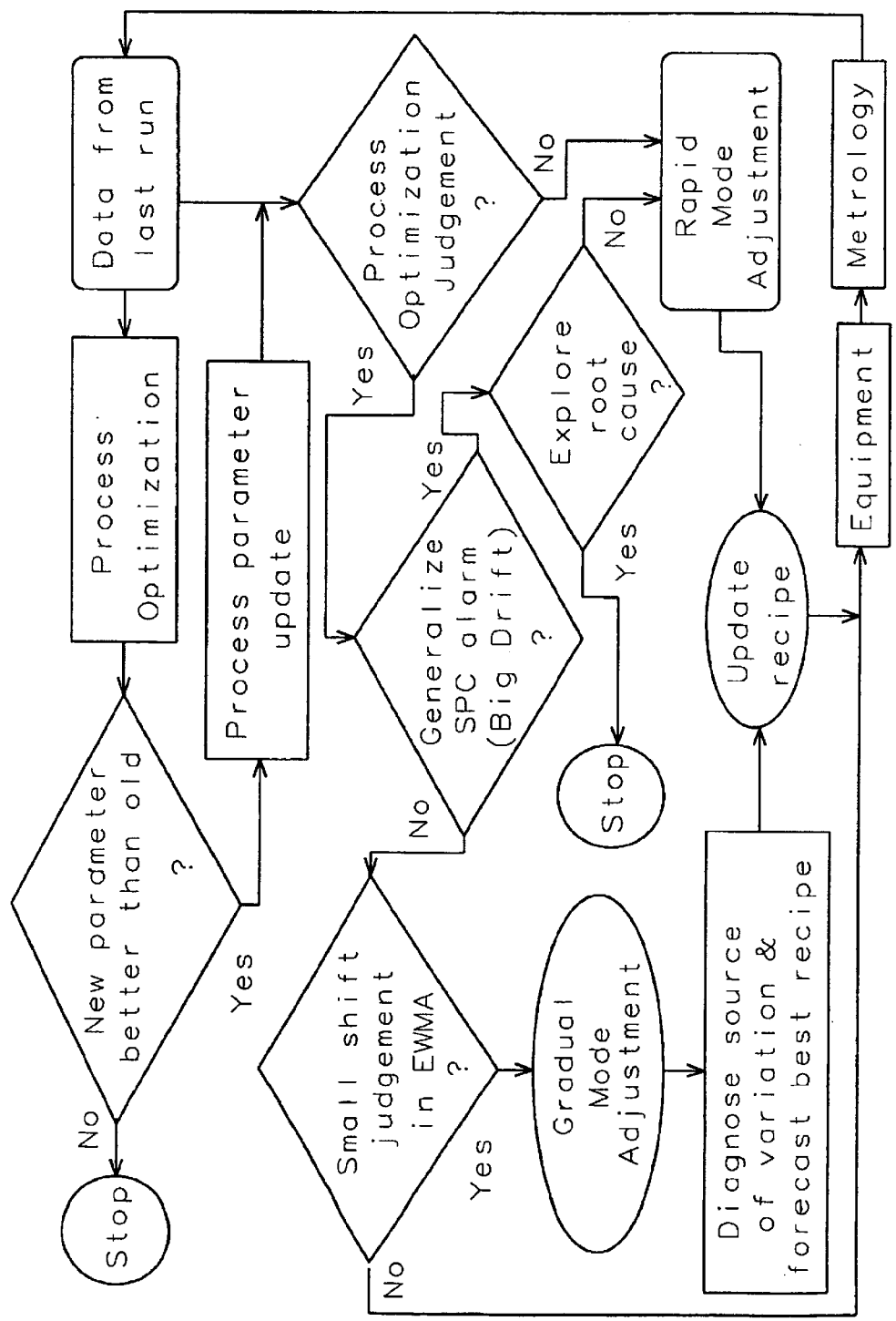
FIG. 5 illustrates a flow chart showing the gradual and rapid mode corrections of the advanced process control system of the present invention.

The APC system of the present invention has three modes: rapid mode, gradual mode, and generalized SPC mode. This is illustrated in FIG. 5. Gradual mode is designed to offset gradual drifts in the process while rapid mode is designed to do the same for sudden shifts in the process. The generalized SPC mode will choose between the two modes based on the deviation of the process output from the model predictions. That is, if the difference between the desired value and the actual value of the parameter is less than about 1–2 sigma in historical data calculation, the drift is said to be gradual. If the difference is more than about 3 sigma in historical data calaculation, the drift is said to be sudden.

When running the first lot for a new mask, the APC system of the present invention will estimate energy by assigning the energy of the reticle which comes from the information technology (IT) system. Since this energy value is only an estimate, this lot must be excluded from the database. During running of the APC system of the present invention, four situations will result in a report:

1. The process shift quantity is above a pre-determined value.
2. The Desired Energy divided by the actual Energy is greater than a pre-determined value.
3. An out of control situation occurs in the SPC monitor.
4. An engineer desires to monitor the process.

The APC process of the present invention has been implemented. With the process of the invention, the output CD is closer to the process target. More specifically, the rework rate was reduced by 80%. Throughput increased 0.43%, photoresist material savings were 0.31%, and working hours were reduced by 15%.

While the invention has been particularly shown and described with reference to the preferred embodiments thereof, it will be understood by those skilled in the art that various changes in form and details may be made without departing from the spirit and scope of the invention.

What is claimed is:

1. A method of process control comprising:
    providing a plurality of tools and a plurality of products to be run on said tools;
    calculating a desired recipe for each product on each tool based on a previous recipe used for each product on each tool and deviation of a parameter from a target value;
    thereafter running said plurality of products on said plurality of tools; and
    updating said desired recipe after each run of each tool.

2. The method according to claim 1 wherein each said desired recipe is calculated for known said previous recipes and said parameters.

3. The method according to claim 1 wherein for unknown said previous recipes and said parameters, each said desired recipe is estimated using an expectation maximization algorithm.

4. The method according to claim 1 wherein said step of updating said desired recipe is performed in gradual mode if said deviation of said parameter from said target value is less than about 1–2 sigma.

5. The method according to claim 1 wherein said step of updating said desired recipe is performed in rapid mode if said deviation of said parameter from said target value is more than about 3 sigma.

6. A method of process control of a photolithography process comprising:
    providing a plurality of photolithography tools and a plurality of products to be run on said photolithography tools;
    calculating a desired energy for each product on each photolithography tool based on a previous energy used for each product on each tool and deviation of a critical dimension from a target value;
    thereafter running said plurality of products on said plurality of photolithography tools; and
    updating said desired energy after each run of each photolithography tool.

7. The method according to claim 6 wherein each said desired energy is given by said previous energy+slope× (critical dimension−target) where slope is a constant variable assigned by a user.

8. The method according to claim 7 wherein for unknown values for said previous energy and said critical dimension, said desired energy is estimated using an expectation maximization algorithm.

9. The method according to claim 6 wherein said step of updating said desired recipe is performed in gradual mode if said deviation of said parameter from said target value is less than about 1–2 sigma.

10. The method according to claim 6 wherein said step of updating said desired recipe is performed in rapid mode if said deviation of said parameter from said target value is more than about 3 sigma.

11. A method of process control comprising:
    in a first phase running off-line:
        providing a plurality of tools and a plurality of products to be run on said tools; and
        calculating a desired recipe for each product on each tool based on a previous recipe used for each product on each tool and deviation of a parameter from a target value; and in a second phase running in real-time:
  running said plurality of products on said plurality of tools; and
  updating said desired recipe after each run of each tool.

12. The method according to claim 11 wherein each said desired recipe is calculated for known said previous recipes and said parameters.

13. The method according to claim 11 wherein for unknown said previous recipes and said parameters, each said desired recipe is estimated using an expectation maximization algorithm.

14. The method according to claim 11 wherein said step of updating said desired recipe is performed in gradual mode if said deviation of said parameter from said target value is less than about 1–2 sigma.

15. The method according to claim 11 wherein said step of updating said desired recipe is performed in rapid mode if said deviation of said parameter from said target value is more than about 3 sigma.

* * * * *